United States Patent
Deever

(10) Patent No.: US 9,407,818 B2
(45) Date of Patent: Aug. 2, 2016

(54) USING CAPTURED HIGH AND LOW RESOLUTION IMAGES

(71) Applicant: Intellectual Ventures Fund 83 LLC, Las Vegas, NV (US)

(72) Inventor: Aaron T. Deever, Pittsford, NY (US)

(73) Assignee: INTELLECTUAL VENTURES FUND 83 LLC, Las Vegas, NV (US)

( * ) Notice: Subject to any disclaimer, the term of this patent is extended or adjusted under 35 U.S.C. 154(b) by 49 days.

(21) Appl. No.: 14/247,438

(22) Filed: Apr. 8, 2014

(65) Prior Publication Data

US 2014/0218553 A1    Aug. 7, 2014

Related U.S. Application Data

(63) Continuation of application No. 12/550,559, filed on Aug. 31, 2009, now Pat. No. 8,724,928.

(51) Int. Cl.
| | |
|---|---|
| G06K 9/34 | (2006.01) |
| G06K 9/40 | (2006.01) |
| H04N 5/232 | (2006.01) |
| G06T 3/40 | (2006.01) |
| H04N 5/217 | (2011.01) |
| H04N 9/04 | (2006.01) |
| H04N 5/347 | (2011.01) |

(52) U.S. Cl.
CPC .......... *H04N 5/23232* (2013.01); *G06T 3/4076* (2013.01); *H04N 5/217* (2013.01); *H04N 9/045* (2013.01); *H04N 5/347* (2013.01)

(58) Field of Classification Search
USPC ......... 382/254, 298, 299, 190, 195, 274, 275, 382/300, 144, 145, 293
See application file for complete search history.

(56) References Cited

U.S. PATENT DOCUMENTS

| | | | |
|---|---|---|---|
| 3,971,065 | A | 7/1976 | Bayer |
| 5,506,619 | A | 4/1996 | Adams, Jr. et al. |

(Continued)

FOREIGN PATENT DOCUMENTS

| | | |
|---|---|---|
| EP | 1 492 051 | 12/2004 |
| EP | 2 059 027 | 5/2009 |

(Continued)

OTHER PUBLICATIONS

Park et al. "Super-ResolutionImage Reconstruction: A Technical Overview" ; IEEE Signal Processing Magazine (May 2003) pp. 1-16.*

(Continued)

*Primary Examiner* — Chan Park
*Assistant Examiner* — Mia M Thomas

(57) ABSTRACT

A method for producing an improved high resolution image is disclosed including capturing low resolution images and a high resolution image; combining the low resolution images to provide an aggregate low resolution image; reducing the resolution of the high resolution image to provide an image representative of a low resolution image that could have been captured by the image capture device; interpolating the representative low resolution image to provide an interpolated high resolution image; calculating a residual image from the high resolution image and the interpolated high resolution image; combining the representative low resolution image and the aggregate low resolution image to provide a final low resolution image; and using the final low resolution image and the residual image to provide the improved high resolution image.

14 Claims, 9 Drawing Sheets

(56) References Cited

U.S. PATENT DOCUMENTS

| | | | |
|---|---|---|---|
| 5,629,734 A | 5/1997 | Hamilton, Jr. et al. | |
| 5,652,621 A | 7/1997 | Adams, Jr. et al. | |
| 5,949,914 A | 9/1999 | Yuen | |
| 6,356,315 B1* | 3/2002 | Chen | G06T 3/4023 348/440.1 |
| 6,697,540 B1* | 2/2004 | Chen | G06T 5/003 348/625 |
| 6,711,297 B1 | 3/2004 | Chang et al. | |
| 6,816,197 B2* | 11/2004 | Keshet et al. | 348/273 |
| 6,937,291 B1* | 8/2005 | Gryskiewicz | G06T 3/4023 345/660 |
| 7,065,262 B1* | 6/2006 | Silver | G06K 9/32 382/199 |
| 7,146,059 B1* | 12/2006 | Durand et al. | 382/260 |
| 7,162,101 B2 | 1/2007 | Itokawa et al. | |
| 7,174,055 B2 | 2/2007 | Hori et al. | |
| 7,239,342 B2 | 7/2007 | Kingetsu et al. | |
| 7,352,911 B2* | 4/2008 | Maurer | 382/260 |
| 7,420,592 B2* | 9/2008 | Freeman | 348/219.1 |
| 7,434,734 B2 | 10/2008 | Huber | |
| 7,474,768 B2 | 1/2009 | Ohtsuka | |
| 7,613,360 B2 | 11/2009 | Ma et al. | |
| 7,643,034 B2 | 1/2010 | Lefebvre et al. | |
| 7,657,118 B2* | 2/2010 | Aufranc et al. | 382/276 |
| 7,817,161 B2 | 10/2010 | Lefebvre et al. | |
| 7,826,685 B2 | 11/2010 | Riley et al. | |
| 7,936,949 B2 | 5/2011 | Riley et al. | |
| 8,068,117 B2 | 11/2011 | Lefebvre et al. | |
| 8,078,009 B2 | 12/2011 | Riley et al. | |
| 8,130,278 B2 | 3/2012 | Border et al. | |
| 8,179,445 B2 | 5/2012 | Hao | |
| 8,285,033 B2* | 10/2012 | Das Gupta et al. | 382/162 |
| 8,487,996 B2* | 7/2013 | Mann | G01C 11/025 348/135 |
| 8,605,970 B2* | 12/2013 | Bar-Aviv et al. | 382/128 |
| 8,687,736 B1* | 4/2014 | Huynh | H04L 5/06 375/322 |
| 9,041,835 B2 | 5/2015 | Honda | H04N 5/21 348/241 |
| 9,179,039 B2* | 11/2015 | Metcalfe | H04N 1/393 |
| 2004/0141659 A1 | 7/2004 | Zhang | |
| 2005/0013509 A1 | 1/2005 | Samadani | |
| 2005/0135700 A1* | 6/2005 | Anderson | G06T 5/002 382/261 |
| 2005/0226525 A1* | 10/2005 | Kuraki et al. | 382/261 |
| 2005/0259864 A1* | 11/2005 | Dickinson | G06K 9/00134 382/154 |
| 2006/0017837 A1 | 1/2006 | Sorek et al. | |
| 2006/0182361 A1* | 8/2006 | Ptucha | G06T 5/009 382/254 |
| 2006/0187308 A1 | 8/2006 | Lim et al. | |
| 2007/0024931 A1 | 2/2007 | Compton et al. | |
| 2007/0104394 A1* | 5/2007 | Chou | G06T 3/4007 382/300 |
| 2007/0223831 A1 | 9/2007 | Mei et al. | |
| 2008/0100878 A1* | 5/2008 | Hunter et al. | 358/450 |
| 2008/0165258 A1* | 7/2008 | Wajs | 348/222.1 |
| 2009/0232213 A1* | 9/2009 | Jia | G06T 3/4053 375/240.16 |
| 2010/0026839 A1* | 2/2010 | Border et al. | 348/231.2 |
| 2010/0033602 A1* | 2/2010 | Okada | H04N 5/232 348/241 |
| 2010/0128928 A1 | 5/2010 | Ishiwatari | |
| 2011/0052095 A1 | 3/2011 | Deever | |
| 2011/0064329 A1* | 3/2011 | Steinberg et al. | 382/296 |
| 2011/0142366 A1* | 6/2011 | Young | G06T 3/4069 382/274 |
| 2011/0150331 A1* | 6/2011 | Young | G06T 3/4015 382/167 |
| 2011/0216210 A1 | 9/2011 | Hao | |
| 2012/0242897 A1 | 9/2012 | Chattopadhyay et al. | |
| 2012/0269425 A1* | 10/2012 | Marchesotti | G06K 9/036 382/159 |
| 2012/0328213 A1 | 12/2012 | Yamamoto et al. | |

FOREIGN PATENT DOCUMENTS

| | | |
|---|---|---|
| GB | 2 373 946 | 10/2002 |
| TW | 200803478 | 1/2008 |
| WO | WO-02/48960 | 6/2002 |
| WO | WO-2006/058191 | 6/2006 |

OTHER PUBLICATIONS

International Search Report and Written Opinion for PCT/US2012/046585, mailed Nov. 9, 2010.

Min Kyu Park et al, "Super-Resolution Image Reconstruction: A Technical Overview," IEEE Signal Processing Magazine, vol. 20, No. 3, May 1, 2003, pp. 21-36.

Non-Final Office Action on U.S. Appl. No. 12/550,559, mailed Oct. 24, 2013.

Non-Final Office Action on U.S. Appl. No. 12/550,559, mailed Feb. 27, 2013.

Notice of Allowance on U.S. Appl. No. 12/550,559, mailed Jan. 2, 2014.

Pelletier, Stephane et al., "High-Resolution Video Synthesis from Mixed-Resolution Video Based on the Estimate-and-Correct Method", 2005 Seventh IEEE Workshops, Jan. 1, 2005, pp. 172-177.

Office Action on Taiwan Application 099129063 mailed Dec. 1, 2014. (English translation not available).

* cited by examiner

FIG. 2
*(Prior Art)*

| R | G | R | G |
|---|---|---|---|
| G | B | G | B |
| R | G | R | G |
| G | B | G | B |

FIG. 9
*(Prior Art)*

| R | P | G | P |
|---|---|---|---|
| P | R | P | G |
| G | P | B | P |
| P | G | P | B |

USING CAPTURED HIGH AND LOW RESOLUTION IMAGES

CROSS-REFERENCE TO RELATED PATENT APPLICATIONS

This application is a Continuation of U.S. application Ser. No. 12/550,559, filed Aug. 31, 2009, incorporated herein by reference in its entirety.

FIELD

The disclosure pertains to generating an improved image from multiple images. More specifically, multiple images are used to form a high resolution image having reduced motion blur and reduced noise.

BACKGROUND

A problem to be addressed is light deficient photography in the presence of motion during image capture causing motion blur in the image. The motion can be of a global variety, where the entire scene being imaged moves together or of a local variety, where one or more portions of the scene move at a different speed or direction compared to the rest of the scene. Global motion is due to a relative motion between the scene and the camera during image capture. Local motion is due to objects within the scene moving relative to the other portions of the scene. Local motion can occur differently in different portions of the scene.

In the case where the exposure time is short and motion is slow, a single image capture can be used to capture an image with good image quality. However, as the exposure time required to get an image with a high signal-to-noise ratio becomes longer relative to the motion that is present during the image capture, or the available light decreases, captured image quality degrades in the form of increased motion blur and increased noise within the image.

For consumer digital cameras, there is a trend for the size of the pixels to get smaller over time, which decreases the available area to capture light during the exposure so that noise becomes more of a problem. Exposure times can be increased to compensate for smaller pixels, but then motion blur becomes more of a problem. Consequently, methods to increase the sensitivity of pixels to light have been described as in United States Patent Publication No. 2007/0024931 by Compton, et al, which adds panchromatic pixels to the image sensor.

As the motion increases relative to the exposure time or the available light decreases there are a series of compromises that can be made. Several compromises can be made in photographic space to increase spatial resolution, temporal resolution or image quality, but, it is important to note that with each gain there will also be losses. For instance, the exposure time can be decreased to reduce motion blur thereby increasing temporal resolution, but at the expense of increasing noise in the image.

Flash is an effective way to reduce noise in the image and by enabling a shorter exposure time, the temporal resolution is increased but at the expense of uneven lighting and redeye. Additionally, there are image capture situations for which a flash is either not available or not beneficial.

Optically based image stabilization can be used during the exposure to enable a longer exposure time to reduce noise in the image while decreasing motion blur and increasing spatial resolution. However, optically based image stabilization can only be used to reduce motion blur from camera motion (global motion). Additionally, optical image stabilization increases the cost and weight associated with the image capture device.

The effective size of the pixels can be increased to enable a reduced exposure time by binning (i.e., adjacent pixels are connected to one another so the charge on the adjacent pixels is summed and the signal is increased). However, binning is accompanied by a decrease in spatial resolution.

Another method to reduce blur is to capture two high resolution images, one with a short exposure time, and one with a long exposure time. The short exposure time is selected so as to generate an image that is noisy, but relatively free of motion blur. The long exposure time is selected so as to generate an image that has little noise, but that can have significant motion blur. Image processing algorithms are used to combine the two captures into one final output image. Such approaches are described in U.S. Pat. No. 7,239,342, U.S. Patent Application Publication No. 2006/0017837, U.S. Patent Application Publication 2006/0187308 and U.S. Patent Application Publication 2007/0223831. The drawbacks of these approaches include a requirement for additional buffer memory to store multiple high resolution images, additional complexity to process multiple high resolution images and potential gaps in time between the two image captures.

Another method to reduce blur is through image restoration—de-blurring—algorithms applied post-capture. An example of such an approach is the well-known Lucy-Richardson de-convolution algorithm. Drawbacks of this and similar approaches include high computational complexity and sensitivity to noise.

Multiple low resolution video images can be used to form a single image with improved image quality while maintaining spatial resolution and offering a balance between temporal resolution and exposure time. Reading multiple images within a given time can reduce motion blur by using a shorter exposure time for each image, however, each image will be noisier. By aligning the multiple images with each other to correct for motion between individual image captures and then summing the individual images together, the noise can be reduced in the formed single image.

While multiple low resolution video images can be readout relatively quickly (30-60 images/sec is typical), and the images typically have lower noise since the pixels are often binned, the single image that can be formed is limited to relatively low resolution. Conversely, multiple high resolution images can be used to form a high resolution single image. However, high resolution images typically are noisier since the pixels are smaller, and more significantly, a relatively large amount of time is required to readout multiple high resolution images (1.5-7 images/sec is typical) due to hardware limitations. In addition, the problem of aligning the images grows large due to significant motion between the image captures.

Therefore, a need in the art exists for an improved solution to combining multiple images to form an improved image, especially in scenes where motion is present.

SUMMARY

The object of this disclosure is to produce an improved high resolution image using low resolution images and at least one high resolution image. The object is achieved by a method for using low resolution images and at least one high resolution image of a scene captured by the same image capture device to provide an improved high resolution image, comprising:

a) using the image capture device to capture a plurality of low resolution images of the scene and at least one high resolution image of the scene having a resolution greater than that of the low resolution images;

b) combining the low resolution images to provide an aggregate low resolution image; and c) combining the high resolution image with the aggregate low resolution image to provide the improved high resolution image by:

i) reducing the resolution of the high resolution image to provide an image representative of a low resolution image that could have been captured by the image capture device;

ii) interpolating the representative low resolution image to provide an interpolated high resolution image;

iii) calculating a residual image from the high resolution image and the interpolated high resolution image;

iv) combining the representative low resolution image and the aggregate low resolution image to provide a final low resolution image; and v) using the final low resolution image and the residual image to provide the improved high resolution image.

An advantage of the present disclosure is that an improved high resolution image can be produced with basic changes to the image processing software without having to use a photographic flash or long exposure times to properly expose a single image.

A further advantage of the present disclosure is that an improved high resolution image can be produced without the need for costly special lenses with laterally moveable lens elements.

A further advantage of the present disclosure is that an improved high resolution image can be produced without increased buffer memory requirements for storing multiple high resolution images.

A further advantage of the present disclosure is that an improved high resolution image can be produced without the need for computationally complex de-blurring algorithms.

A still further advantage of the present disclosure is that it can produce a high resolution image having reduced motion blur and reduced noise.

This and other aspects, objects, features, and advantages of the present disclosure will be more clearly understood and appreciated from a review of the following detailed description of the preferred embodiments and appended claims, and by reference to the accompanying drawings.

BRIEF DESCRIPTION OF THE DRAWINGS

FIG. 2 (prior art) is a view of a Bayer color filter array pattern for a portion of an image sensor;

FIG. 9 (prior art) is a view of a color filter array pattern for a representative portion of an image sensor containing panchromatic and color pixels.

DETAILED DESCRIPTION OF THE PREFERRED EMBODIMENTS

Because digital cameras employing imaging devices and related circuitry for signal capture and correction and for exposure control are well known, the present description will be directed in particular to elements forming part of, or cooperating more directly with, method and apparatus in accordance with the present disclosure. Elements not specifically shown or described herein are selected from those known in the art. Certain aspects of the embodiments to be described are provided in software. Given the system as shown and described according to the disclosure in the following materials, software not specifically shown, described or suggested herein that is useful for implementation of the disclosure is conventional and within the ordinary skill in such arts.

Figure 1:
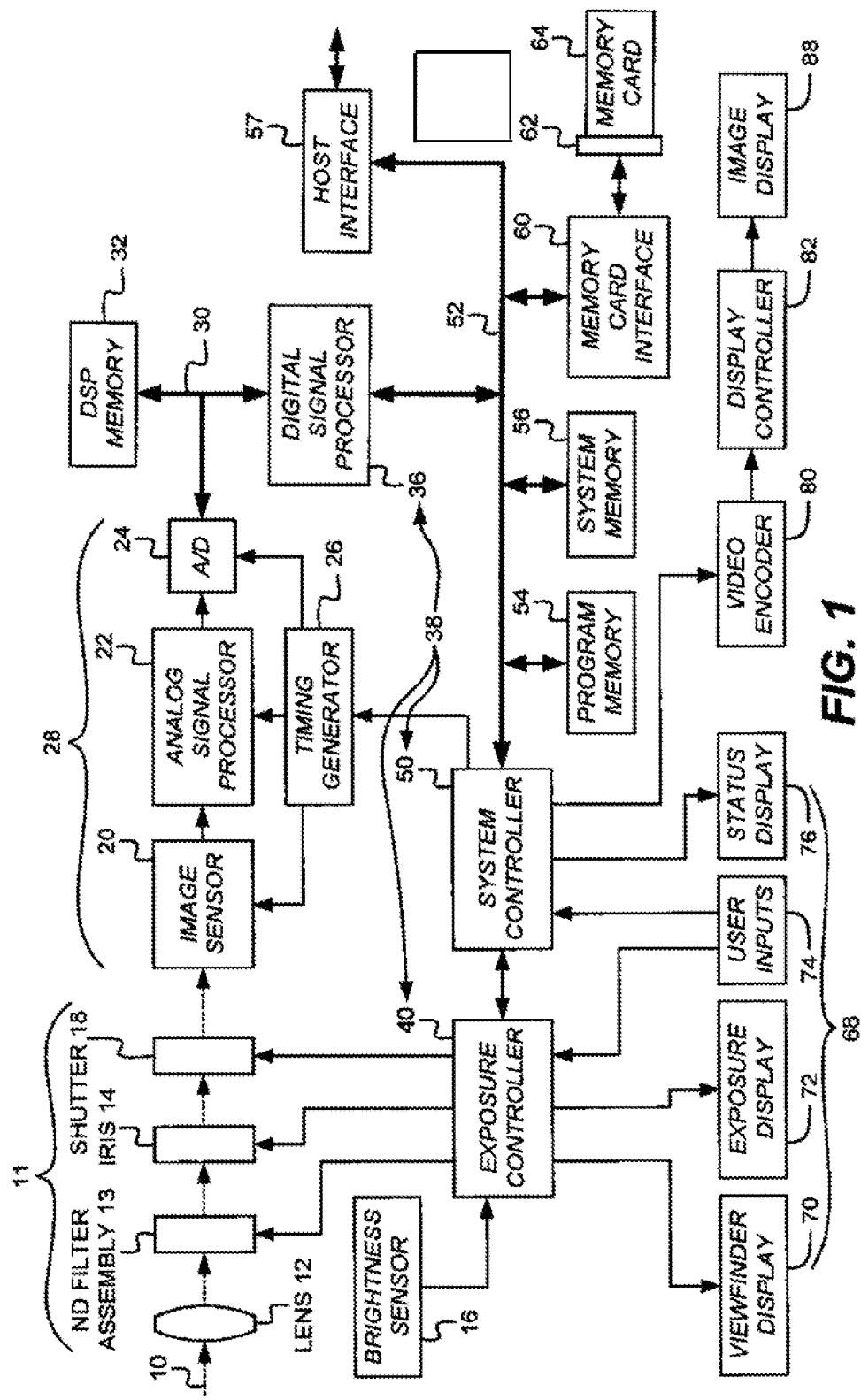
FIG. 1 is a block diagram of a conventional digital still camera system that can employ a conventional sensor and processing methods or the sensor and processing methods of the current disclosure.

Turning now to FIG. 1, a block diagram of an image capture device shown as a digital camera embodying the present disclosure is shown. Although a digital camera will now be explained, the present disclosure is clearly applicable to other types of image capture devices, such as imaging sub-systems included in non-camera devices such as mobile phones and automotive vehicles, for example.

Light 10 from the subject scene is input to an imaging stage 11, where the light is focused by lens 12 to form an image on solid-state image sensor 20. Image sensor 20 converts the incident light to an electrical signal by integrating charge for each picture element (pixel). The image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process). The sensor includes an arrangement of color filters, as described in more detail subsequently.

The amount of light reaching the sensor 20 is regulated by an iris block 14 that varies the aperture and the neutral density (ND) filter block 13 that includes one or more ND filters interposed in the optical path. Also regulating the overall light level is the time that the shutter block 18 is open. The exposure controller block 40 responds to the amount of light available in the scene as metered by the brightness sensor block 16 and controls all three of these regulating functions.

The analog signal from image sensor 20 is processed by analog signal processor 22 and applied to analog to digital (A/D) converter 24 for digitizing the sensor signals. Timing generator 26 produces various clocking signals to select rows and pixels and synchronizes the operation of analog signal processor 22 and A/D converter 24. The image sensor stage 28 includes the image sensor 20, the analog signal processor 22, the A/D converter 24, and the timing generator 26. The functional elements of image sensor stage 28 are separately fabricated integrated circuits, or they are fabricated as a single integrated circuit as is commonly done with CMOS image sensors. The resulting stream of digital pixel values from A/D converter 24 is stored in memory 32 associated with digital signal processor (DSP) 36.

Digital signal processor 36 is one of three processors or controllers in this embodiment, in addition to system controller 50 and exposure controller 40. Although this distribution of camera functional control among multiple controllers and processors is typical, these controllers or processors are combined in various ways without affecting the functional operation of the camera and the application of the present disclosure. These controllers or processors can comprise one or more digital signal processor devices, microcontrollers, programmable logic devices, or other digital logic circuits. Although a combination of such controllers or processors has been described, it should be apparent that one controller or processor is designated to perform all of the needed functions. All of these variations can perform the same function and fall within the scope of this disclosure, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software needed for practicing image processing shown in FIG. 18. Memory 32 includes any type of random access memory, such as SDRAM. A bus 30 comprising a pathway for address and data signals connects DSP 36 to its related memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high-speed connection to a personal computer (PC) or other host computer for transfer of image data for display, storage, manipulation or printing. This interface is an IEEE1394 or USB2.0 serial interface or any other suitable digital interface. Memory card 64 is typically a Compact Flash (CF) card inserted into socket 62 and connected to the system controller 50 via memory card interface 60. Other types of storage that are used include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

The user interface 68, including all or any combination of viewfinder display 70, exposure display 72, status display 76 and image display 88, and user inputs 74, is controlled by a combination of software programs executed on exposure controller 40 and system controller 50. User inputs 74 typically include some combination of buttons, rocker switches, joysticks, rotary dials or touch screens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture, the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. Because of this flexibility, digital still cameras can have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that can be selected to reduce the cost, add features, or improve the performance of the camera. For example, an autofocus system is added, or the lens is detachable and interchangeable. It will be understood that the present disclosure is applied to any type of digital camera or, more generally, digital image capture apparatus, where alternative modules provide similar functionality.

Given the illustrative example of FIG. 1, the following description will then describe in detail the operation of this camera for capturing images according to the present disclosure. Whenever general reference is made to an image sensor in the following description, it is understood to be representative of the image sensor 20 from FIG. 1. Image sensor 20 shown in FIG. 1 typically includes a two-dimensional array of light sensitive pixels fabricated on a silicon substrate that convert incoming light at each pixel into an electrical signal that is measured. In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values. The term color pixel will refer to a pixel having a color photoresponse over a relatively narrow spectral band. The terms exposure duration and exposure time are used interchangeably.

As sensor 20 is exposed to light, free electrons are generated and captured within the electronic structure at each pixel. Capturing these free electrons for some period of time and then measuring the number of electrons captured, or measuring the rate at which free electrons are generated, can measure the light level at each pixel. In the former case, accumulated charge is shifted out of the array of pixels to a charge-to-voltage measurement circuit as in a charge-coupled device (CCD), or the area close to each pixel can contain elements of a charge-to-voltage measurement circuit as in an active pixel sensor (APS or CMOS sensor).

Figure 2:
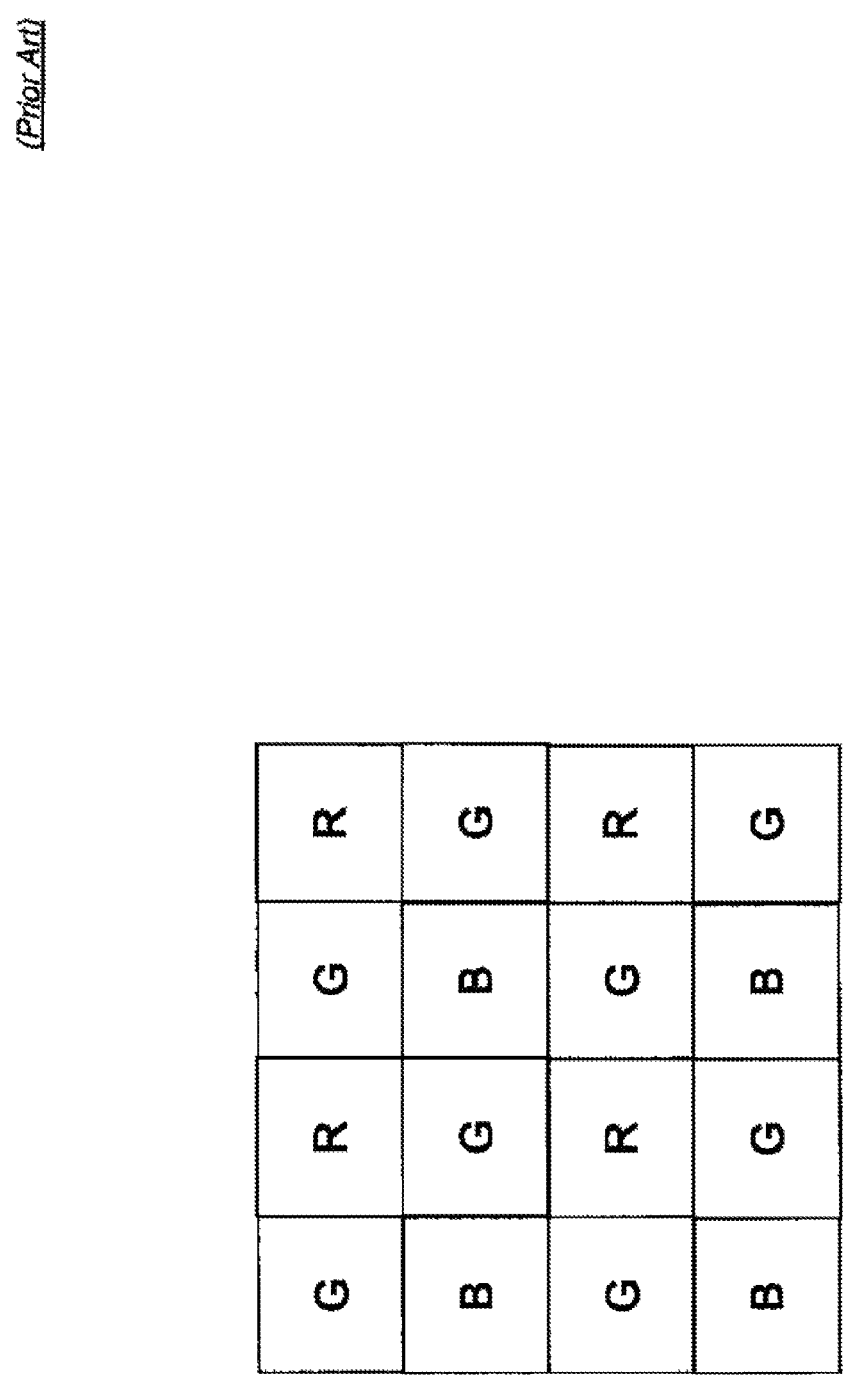

In order to produce a color image, the array of pixels in an image sensor typically has a pattern of color filters placed over them. FIG. 2 shows a pattern of red (R), green (G), and blue (B) color filters that is commonly used. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum.

An image captured using an image sensor having a two-dimensional array with the CFA of FIG. 2 has only one color value at each pixel. In order to produce a full color image, there are a number of techniques for inferring or interpolating the missing colors at each pixel. These CFA interpolation techniques are well known in the art and reference is made to the following patents: U.S. Pat. No. 5,506,619; U.S. Pat. No. 5,629,734; and U.S. Pat. No. 5,652,621.

One drawback of the CFA pattern illustrated in FIG. 2 is that much of the light incident on a given pixel is filtered out, resulting in noisy images in low-light conditions. One type of solution that has been proposed to improve low-light imaging is the use of some portion of sensor array pixels as panchromatic pixels. For example, commonly assigned U.S. Patent Application No. 2007/0024931 entitled "Image Sensor with Improved Light Sensitivity" by Compton et al. discloses an image sensor having both color and panchromatic pixels. In the context of the present disclosure, the term panchromatic pixel refers to a pixel having a generally panchromatic photoresponse, with a wider spectral sensitivity than the narrower spectral sensitivities represented in the selected set of color photo-responses. That is, a panchromatic pixel can have high sensitivity to light across the entire visible spectrum. Although the panchromatic pixels generally have a wider spectral sensitivity than the set of color photo-responses, each panchromatic pixel can also have an associated filter. Such filter can be either a neutral density filter or a color or bandwidth filter.

Figure 3:
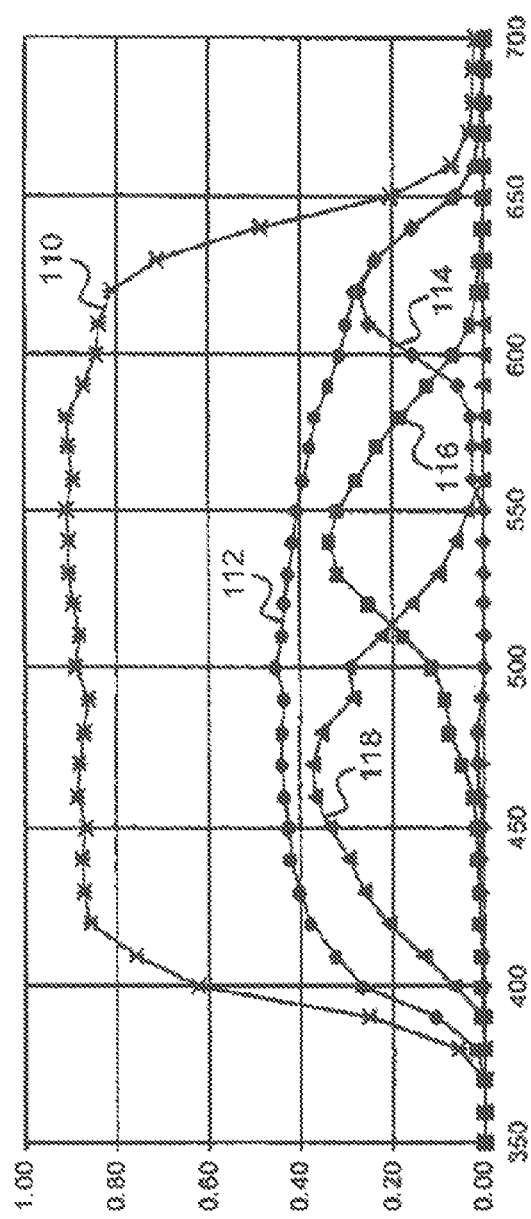
FIG. 3 (prior art) provides representative spectral quantum efficiency curves for red, green, and blue pixels, as well as a wider spectrum panchromatic quantum efficiency, all multiplied by the transmission characteristics of an infrared cut filter.

Referring to the graph of FIG. 3, there are shown the relative spectral sensitivities of pixels with red, green, and blue color filters in a typical camera application. The X-axis in FIG. 3 represents light wavelength in nanometers, spanning wavelengths approximately from the near ultraviolet to near infrared, and the Y-axis represents efficiency (normalized). In FIG. 3, curve 110 represents the spectral transmission characteristic of a typical bandwidth filter used to block infrared and ultraviolet light from reaching the image sensor. Such a filter is needed because the color filters used for image sensors typically do not block infrared light, hence the pixels can be unable to distinguish between infrared light and light that is within the pass bands of their associated color filters. The infrared blocking characteristic shown by curve 110 thus prevents infrared light from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by curve 110 to produce the combined system quantum efficiencies represented by curve 114 for red, curve 116 for green, and curve 118 for blue. It is understood from these curves that each color photo-response is sensitive to only a portion of the visible spectrum. By contrast, the photo-response of the same silicon sensor that does not have color filters applied (but including the infrared blocking filter characteristic) is shown by curve 112; this is an example of a panchromatic photo-response. By comparing the color photo-response curves 114, 116, and 118 to the panchromatic photo-response curve 112, it is clear that the panchromatic photo-response can be three to four times more sensitive to wide spectrum light than any of the color photo-responses.

Figure 4:
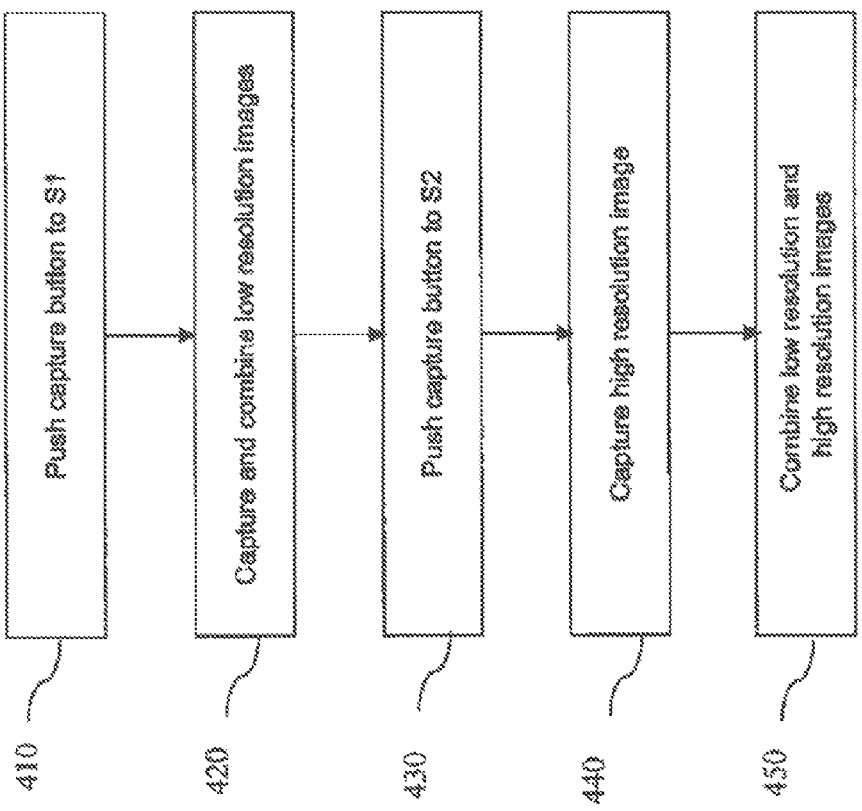
FIG. 4 is a flow diagram showing an embodiment of the current disclosure.

FIG. 4 illustrates a flow diagram according to an embodiment of the present disclosure. In step 410, the operator begins the acquisition process by pushing the capture button on the camera from the S0 position (undepressed position) to the S1 position (partially depressed position) thereby sending a partially-depressed-capture-button signal to the system controller 50 in the camera, as the operator composes the image. The system controller 50 then instructs the camera to begin acquiring and combining multiple low resolution images 420, using available DSP memory 32. It should be noted that at the same time, the system controller 50 in the camera would also typically complete autofocus and autoexposure. When the moment of acquisition is identified by the operator, the operator pushes the capture button from S1 to S2 (fully depressed position) thereby sending a fully-depressed-capture button signal to the system controller 50 in the camera, as shown in Step 430. At this point, in Step 440, the system controller 50 instructs the camera to stop continuous acquisition or capture of the low resolution images and to initiate the acquisition of a high resolution image. Finally, in Step 450 the low and high resolution images are combined to form an improved high resolution image. The collection of all captured low and high resolution images is referred to as a capture set.

The low resolution images captured in Step 420 can be preview images, such as often displayed on the camera LCD display 88. Such images are typically captured and displayed at 30 frames per second at a spatial resolution of 320 columns by 240 rows, or at VGA resolution (640 columns by 480 rows). This spatial resolution is not limiting, however, and the low resolution images can be captured at a greater spatial resolution. The frequency at which the low resolution images can be captured and readout from the sensor is inversely proportional to the spatial resolution of the low resolution images.

The high resolution image captured in Step 440 is of greater spatial resolution than the low resolution images captured during Step 420. Often the high resolution image has the full spatial resolution of the image sensor 20.

The capture of low resolution images can also occur outside of S1. While the camera is in the S0 position, low resolution images can be captured and combined as in Step 420. The capture of low resolution images can also continue through a transition from S0 to S1, or through a transition from S1 to S0.

An example of a capture set is as follows for a 10 megapixel digital camera. When the operator pushes the capture button from S0 to S1, the system controller 50 instructs the camera to begin acquiring and combining low resolution images continuously. The low resolution images are 9× binned—a factor of 3 both horizontally and vertically—so that the resolution of each low resolution image is approximately 1 megapixel. The low resolution images are acquired at 30 images per second. Depending on the light level present in the scene, the low resolution images can be acquired with an exposure time of 1/30 second each or less. The exposure time may change from one low resolution image to the next low resolution image. The images are combined as they are captured, such that only two images are stored in memory—the current image and the aggregate (combined) image. When the capture button is pressed to S2, a single high resolution image is captured. The high resolution image can be acquired at the full sensor resolution of 10 megapixels. The exposure time for the high resolution image can be shorter, longer, or substantially the same as the exposure time for the low resolution images, depending on the light level present in the scene as well as depending on any motion of the camera and scene. The capture set at the completion of capture comprises a single aggregate 1 megapixel image as well as a single 10 megapixel image.

Figure 5:
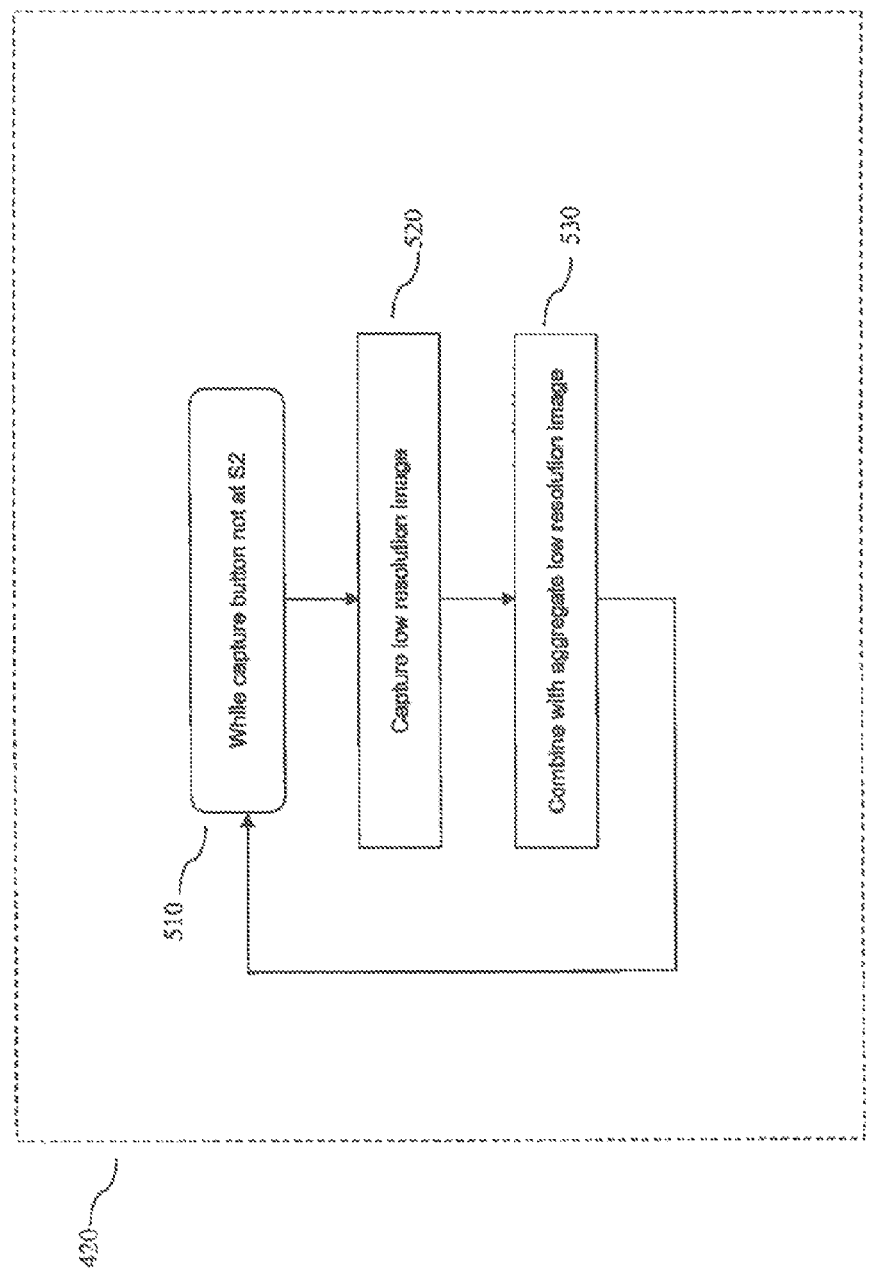
FIG. 5 is a flow diagram illustrating the formation of an aggregate low resolution image.

FIG. 5 describes in more detail the step of capturing and combining low resolution images 420 from FIG. 4. After the operator presses the capture button to the S1 position, the capturing and combining of low resolution images takes place continuously until the capture button is pressed to S2 510. An individual low resolution image is captured 520, and subsequently combined with the aggregate low resolution image 530. In a preferred embodiment, the low resolution images are combined into an aggregate low resolution image using an infinite impulse response filter. Infinite impulse response filters are well-known to those skilled in the art. In the context of this disclosure, an infinite impulse response filter has the property that the filtered value (the aggregate low resolution image) at any instant is a weighted combination of the current and previous low resolution images in which the weight for each low resolution is strictly positive. Specifically, the relationship between the captured low resolution images and aggregate low resolution image is given by the following formula:

$$A[1]=C[1]$$

$$A[n]=(1-\alpha)A[n-1]+\alpha C[n] \text{ for } n>1.$$

In this formula, A represents the aggregate low resolution image. C represents a captured low resolution image, and the number, n, in brackets represents that the associated image corresponds to the nth captured low resolution image. Thus the aggregate low resolution image is initially set equal to the first captured low resolution image. Subsequently, the aggregate low resolution image is updated to equal a weighted combination of the current captured low resolution image and the previous aggregate low resolution image. The parameter a controls the relative importance of the current captured frame. The parameter a is restricted to the range (0,1), with a preferred value of 0.25.

This capture and combine approach requires storage for only two low resolution images at any time—the current captured low resolution image and the aggregate low resolution image. Once a low resolution image has been combined with the aggregate low resolution image, it can be discarded (or used for example only additionally for autofocus and autoexposure and then discarded).

The current captured low resolution image can also be aligned with the aggregate low resolution image before combination. Specifically, a step of motion estimation and compensation can be included to align the captured low resolution image and the aggregate low resolution image. This motion estimation and compensation step can account for global camera motion and additionally local motion as well. Techniques for global and local motion estimation and compensation are various and well-known to those skilled in the art.

In a preferred embodiment, the captured low resolution images remain CFA images when they are combined, and the aggregate low resolution image is a CFA image as well. Alternatively, the captured low resolution images can be color interpolated to generate full color low resolution images, and the aggregate low resolution image can be a full color image as well.

The described approach to combining low resolution images has the advantages that it achieves the noise reduction benefits of averaging many low resolution images without having to simultaneously store them. Additionally, by weighting more recent captured images more heavily, the aggregate low resolution image favors the most recent status of the scene. Compared to an evenly weighted average of low resolution images, the weighted aggregate is more likely to match with the subsequently captured high resolution image. Additionally, an a equal to 0.25 allows computationally efficient combination of the current and aggregate low resolution images, requiring only simple add and shift operations, as opposed to more complex multiply or divide operations. Similarly, an a equal to 0.5 can be used to place additional emphasis on more recent images, while still requiring only add and shift operations.

Figure 6:
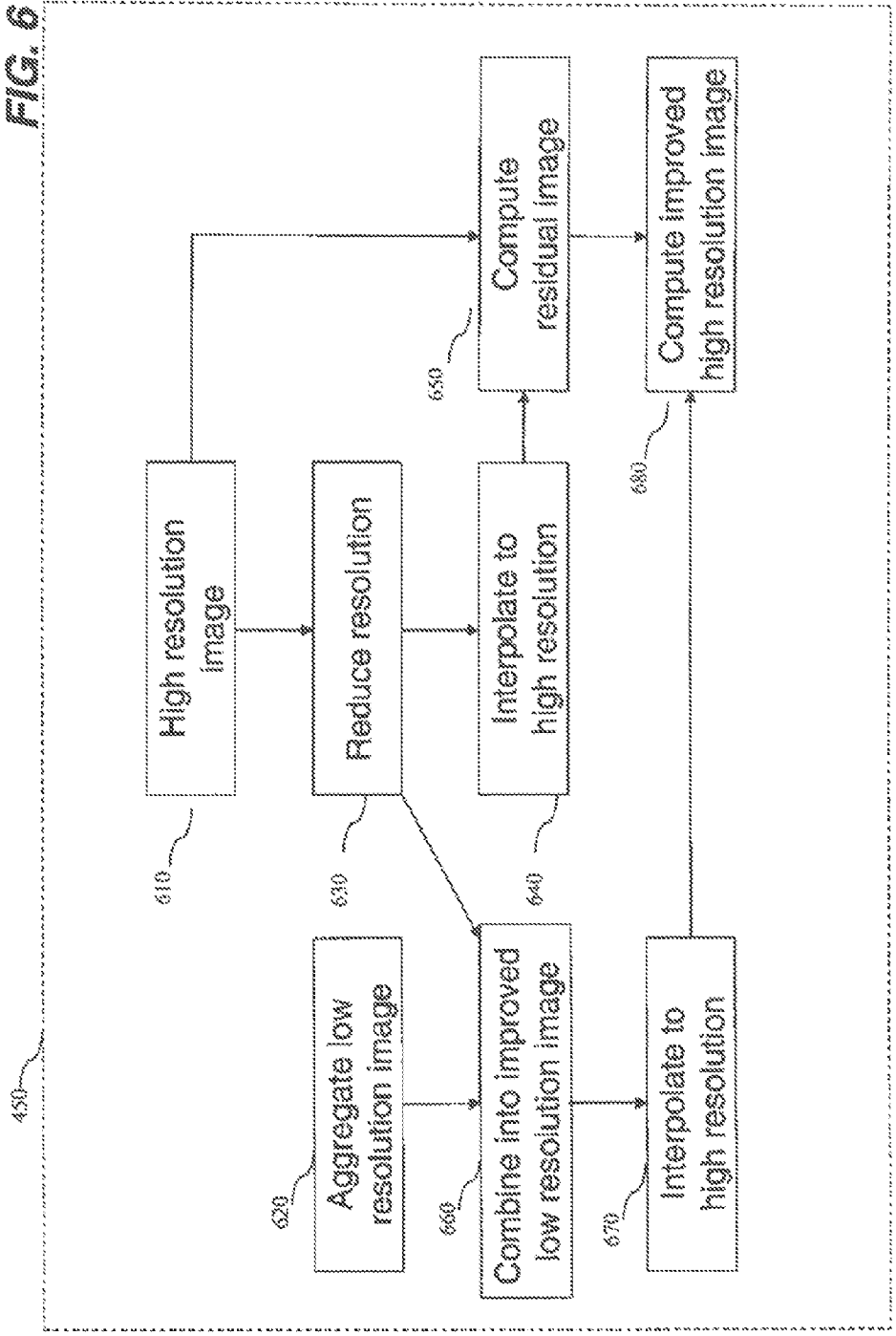
FIG. 6 is a flow diagram illustrating the formation of an improved high resolution image from a high resolution image and an aggregate low resolution image.

FIG. 6 describes in more detail the step of combining the low resolution and high resolution images 450 from FIG. 4.

After the operator pushes the capture button to S2 430, a high resolution image is captured 440. Thus the step of combining the low and high resolution images begins with a high resolution image 610 and an aggregate low resolution image 620. Initially, the high resolution image is reduced in resolution 630. This step produces a representative low resolution image. This step can comprise pixel combining, decimation and cropping. In a preferred embodiment, the step of reducing the resolution of the high resolution image is designed to mimic the steps used by the camera to generate the low resolution images.

An example of a reduction of resolution is as follows for a 5 megapixel Bayer pattern sensor with 2560 columns and 1944 rows. The high resolution image is reduced to generate a 1280 by 720 HD video resolution image, such as generated while the camera button is pressed to the S1 position. 224 rows of data are cropped from the top of the sensor data. 280 rows are cropped from the bottom of the sensor data. The remaining 2560 columns by 1440 rows are digitally combined by a factor of 2 in each dimension. This digital combining is achieved by reducing every 4 by 4 block of Bayer pixel data to a 2 by 2 block of Bayer pixel data. This can be achieved by combining the pixel values of corresponding Bayer pattern pixel locations. Four blue pixel values are combined to generate one combined blue pixel value. Similarly four red pixel values are combined to generate one combined red pixel value. Four green pixels values on the same rows as red pixels are combined to form a combined green pixel value. And the other four green pixels on the same rows as blue pixels are combined to form another combined green pixel value. The combined pixel values can be normalized by dividing the combined pixel value by the number of pixels contributing to the value. The combination step can also discard some of the pixel values. For instance, only two of the four pixel values can be used when forming the combined pixel value.

The representative low resolution image is subsequently spatially interpolated back to the resolution of the original high resolution image 640. This process generates an interpolated high resolution image. In the case that some rows or columns of the original high resolution image are cropped during the formation of the representative low resolution image, the interpolation step only generates an interpolated image with the same resolution as the cropped high resolution image. In a preferred embodiment, bicubic interpolation is used to generate the interpolated high resolution image. Those skilled in the art will recognize, however, that there exist many suitable interpolation techniques to generate an interpolated high resolution image.

In step 650, the interpolated high resolution image is subtracted from the original high resolution image to generate a residual image. If the original and interpolated high resolution images are of different sizes, the residual image can be the same size as the interpolated high resolution image, and additional rows/columns from the original high resolution image can be ignored. Alternatively, the residual image can be the same size as the original high resolution image, and the residual image can have values equal to the original high resolution image at any locations outside the resolution of the interpolated high resolution image. Note that once the residual image is generated, the original high resolution image is no longer needed in storage.

In step 660, the aggregate low resolution image is combined with the representative low resolution image to form a final low resolution image. Once this step is completed, the final low resolution image is interpolated back to the resolution of the (possibly cropped) high resolution image 670. In a preferred embodiment, this interpolation step is identical to the interpolation step used in Step 650. Finally, the result of this interpolation step, the interpolated final low resolution image, is added to the residual image to form an improved high resolution image 680.

Additional noise cleaning operations can be included within the overall framework of FIG. 6. In particular, speckle noise removal can be applied to the original high resolution image provided in Step 610. Additionally, high frequency noise can be removed from the high resolution image by spatially low-pass filtering the residual image computed in Step 660.

Figure 7:
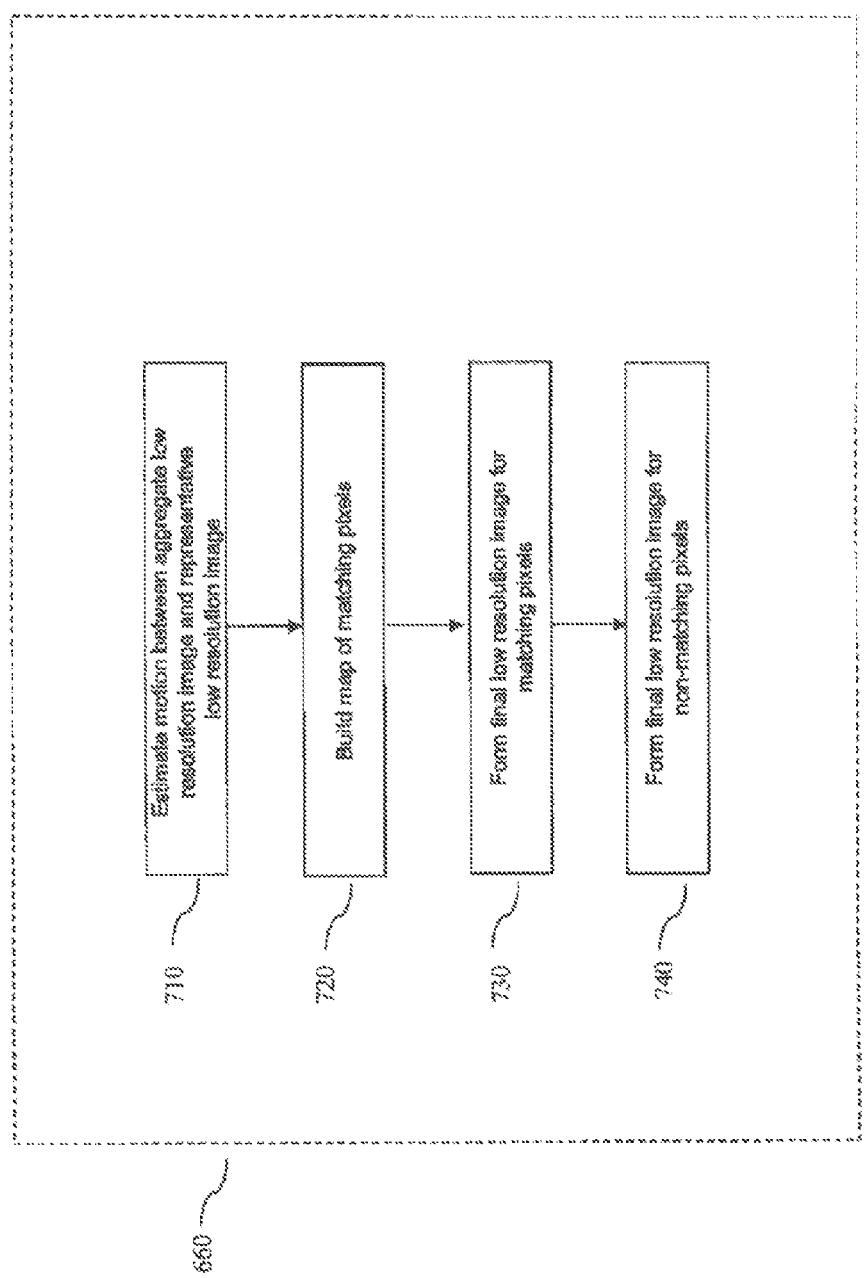
FIG. 7 is a flow diagram illustrating the combination of a representative low resolution image with an aggregate low resolution image.

FIG. 7 describes in more detail the step of combining the aggregate low resolution image with the representative low resolution image to form a final low resolution image 660. In step 710, motion is calculated between the aggregate low resolution image and the representative low resolution image. This can be particularly appropriate in the case that the camera requires a significant period of time to switch from S1 capture mode to S2 and acquire the high resolution image. For example, if ½ second elapses between the capture of the last low resolution image and the capture of the high resolution image, it can be appropriate to align the aggregate and representative low resolution images prior to combining them. This motion correction step can account for global motion resulting from camera movement. It can also account for local motion resulting from the movement of objects within the scene.

Once the aggregate and representative low resolution images are aligned, a map of matching pixels is found 720. Matching pixels are defined as those pixels for which the aggregate and representative low resolution images have matching scene data. The corresponding pixel values can differ as a result of factors such as noise or illumination changes. This map of matching pixels is initially defined by comparing the magnitude of the difference between the aggregate and representative low resolution images to a noise standard deviation. Those pixels whose difference magnitude is less than a scalar multiple of the noise standard deviation are initially classified as matching. The remaining pixels are classified as non-matching. Morphological operations can subsequently be applied to the map to remove isolated non-matching pixels, and also to dilate the boundary of non-matching regions.

In Step 730, the final low resolution image is computed for matching pixels. At these locations, the final low resolution image pixel value is a weighted average of the aggregate low resolution image and representative low resolution image pixel data. The weight can be calculated as a function of the noise standard deviation of the two images. For a given pixel, let $\sigma_A$ be the standard deviation of the noise associated with the aggregate low resolution image pixel data, and let $\sigma_R$ be the standard deviation of the noise associated with the representative low resolution image pixel data. Then the final low resolution image pixel value is given as:

$$I_F = \frac{\sigma_R}{\sigma_R + \sigma_A} I_A + \frac{\sigma_A}{\sigma_R + \sigma_A} I_R,$$

where $I_F$ is the final low resolution image pixel value, $I_A$ is the aggregate low resolution image pixel value, and $I_R$ is the representative low resolution image pixel value. The noise standard deviation for the aggregate low resolution image is a function of the pixel value, the integration time of each low resolution image, and any normalization used as a result of pixel combination. It is also a function of the a parameter used in the infinite impulse response filter to combine the low resolution images. Smaller values of a result in greater potential noise reduction. The noise standard deviation for the representative low resolution image is a function of the pixel value, the integration time of the high resolution image, and any normalization used as a result of pixel combination when forming the representative low resolution image.

In Step 740, the final low resolution image is computed for non-matching pixels. Initially, these pixels are assigned the value of the representative low resolution image. Since these pixels do not have good matches with the aggregate low resolution image, that data is not used. This typically corresponds to regions of motion that are not aligned or for which occlusion prevents any alignment. Non-matching pixels retain greater noise than matching pixels in the final low resolution image. In order to remove or minimize this spatially varying noise in the final low resolution image, the non-matching pixels can be spatially filtered with a spatial low pass filter to reduce noise in equal proportion to what is achieved by the matching pixels.

Figure 8:
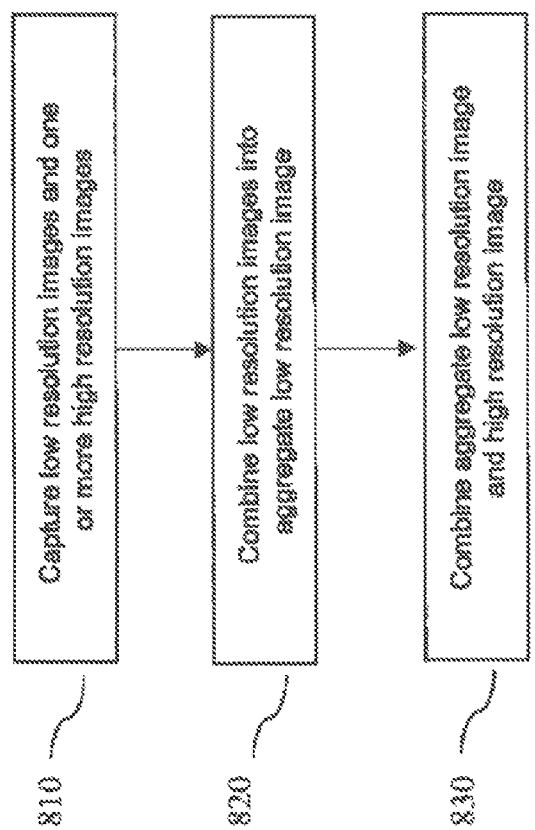
FIG. 8 is a flow diagram of another embodiment of the present disclosure using a sensor with panchromatic and color pixels.
Figure 9:
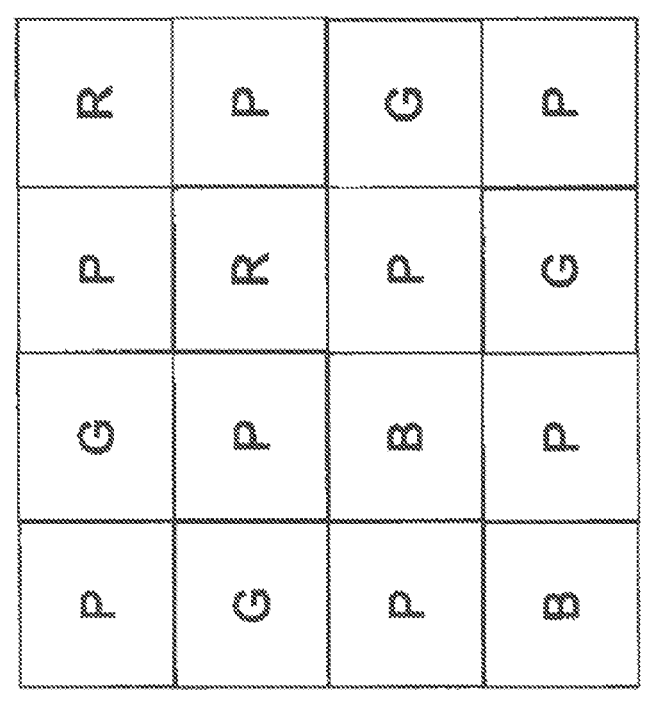

FIG. 8 illustrates an alternative embodiment of the present disclosure. In this embodiment, the low resolution and high resolution images are captured by an image capture device having a sensor containing panchromatic pixels and color pixels. An example of a representative portion of an image sensor containing color and panchromatic pixels is given in FIG. 9. In FIG. 9, panchromatic pixels (P) are combined with red (R), green (G), and blue (P) pixels. Panchromatic pixels provide extra sensitivity to light, and sensors containing panchromatic pixels can be used to achieve improved low-light imaging relative to traditional Bayer CFA sensors. Returning to FIG. 8, in Step 810, multiple low resolution images are captured, followed by one or more high resolution images. In Step 820, the low resolution images are combined into a single aggregate low resolution image. The process of combining the low resolution images can occur after capture is complete. In this case, all of the low resolution images, or at least as many as the camera memory can hold, are stored in the camera prior to the combination of the low resolution images. Alternatively, the low resolution images can be combined into an aggregate low resolution as they are captured. In step 830, the aggregate low resolution image is combined with the high resolution image to produce an improved high resolution image. This approach embodies a combination of techniques to improve low-light imaging performance—the use of panchromatic pixels and the use of multiple low resolution images to improve a high resolution image.

The proposed disclosure provides several advantageous elements for producing an improved high resolution image. Compared to algorithms that use multiple high resolution images to produce an improved high resolution image, the proposed use of low resolution images provides minimal delay between capture of the low resolution images and capture of the high resolution image, thus minimizing the effect of motion occurring during the capture process. Additionally, the use of low resolution images focuses the improvement on the low frequency noise in the high resolution image. Low frequency noise—color blobs—are often considered the most bothersome, objectionable and difficult noise to clean in an image, and the low resolution images specifically provide improvement for low frequency noise.

Another advantageous feature of the proposed disclosure is that it can be implemented with low memory and computational costs, and the output can be fed directly back into the standard image processing chain. The low resolution images can be retained as CFA pattern images, and the improved high resolution image can be an improved CFA pattern image. This improved high resolution image can subsequently be input directly back into the image processing path.

The proposed disclosure is particularly useful for a low-light imaging scenario. In such a case, it can normally be appropriate to have a long exposure to collect enough light to achieve an acceptable signal-to-noise ratio. Such a long exposure, however, can result in a blurred image caused by camera shake during the exposure. Low resolution images can be used to provide an improved signal-to-noise position, and thus reduce the required exposure time for the high resolution image, thereby reducing the motion blur and providing a way for image stabilization.

The proposed disclosure can also be used in conjunction with motion information provided from a device such a gyroscope or accelerometer. Gyroscopic measurements taken during a high resolution capture can indicate if there is significant camera movement occurring during the capture, and if so, the capture can be terminated prematurely, and low resolution images captured previously (or subsequently) can be used to improve the signal-to-noise position, while simultaneously allowing a high resolution image with reduced motion blur.

Gyroscopic measurements available before capture can be used to assess the current and expected movement of the camera during a capture, and can be used to set the high resolution exposure accordingly. If the high resolution exposure is shortened below a desired exposure time, the signal can be supplemented with information from low resolution captures.

A system controller 50 can choose to always shorten the high resolution exposure from the initially calculated target exposure, and compensate for lost signal with low resolution images.

Another use of the proposed disclosure can occur post-capture. The amount of analog and digital gain applied to the high resolution image is analyzed, and if the gain factor is too high, the noise position of the high resolution image can be improved by using the low resolution images.

Another use of the proposed disclosure is to capture high resolution images initially and digitally combine them to form low resolution images. These low resolution images can then be combined with a final captured high resolution image. In this scenario, since multiple high resolution images are read from the sensor, there is no advantage for fast readout of binned images. The high resolution images can be combined into a single aggregate low resolution image, however, such that memory costs remain small. The aggregate low resolution image improves the signal-to-noise ratio in the low frequencies of the high resolution image. Noise in the low frequencies of an image is typically difficult to clean and also visually objectionable.

The frame rate, resolution, and exposure for each low resolution image can be chosen based on capture conditions and camera capabilities. In a preferred embodiment, the resolution of the low resolution images is approximately one-third the resolution of the high resolution image in each dimension. This amount of resolution reduction allows the low resolution images to improve the signal-to-noise in the low frequencies of the high resolution image. It also allows the high resolution image to retain its original high frequencies, which prevents the introduction of visual artifacts that often occurs when trying to combine multiple images of equal spatial resolution and some scene content difference due to motion within the scene. In a preferred embodiment, the low resolution images are captured at 30 images per second, or at the maximum rate of the camera if it is lower than 30 images per second for images of the desired resolution. In a preferred embodiment, the exposure of each low resolution image is equal to the inverse of the rate of the camera. That is, if the camera can capture 30 low resolution images per second, the exposure of each low resolution image is 1/30 second. Additionally, in a preferred embodiment, no pixels are discarded during the binning process. For example, for a binning factor of 3× in each dimension, this results in 9 pixels being combined to form each binned pixel value. In the case that the scene being imaged has sufficient light, such that the described exposure and binning settings result in overexposure and saturation, the low resolution images can be altered by either reducing the exposure of each image or by discarding some pixel data during the binning process.

Those skilled in the art will recognize that there are many alternative methods to the present disclosure.

The disclosure has been described in detail with particular reference to certain preferred embodiments thereof, but it will be understood that variations and modifications can be effected within the scope of the disclosure as described above, and as noted in the appended claims, by a person of ordinary skill in the art without departing from the scope of the disclosure.

PARTS LIST

10 Light
11 Imaging stage
12 Lens
13 Filter block
14 Iris
16 Sensor block
18 Shutter block
20 Image Sensor
22 Analog signal processor
24 A/D converter
26 Timing generator
28 Sensor stage
30 Bus
32 DSP Memory
36 Digital signal processor
38 Processing Stage
40 Exposure controller
50 System controller
52 Bus
54 Program memory
56 System memory
57 Host interface
60 Memory card interface
62 Socket
64 Memory card
68 User interface
70 Viewfinder display
72 Exposure display
74 User inputs
76 Status display
80 Video encoder
82 Display controller
88 Image display
110 Filter transmission curve
112 Panchromatic photo-response curve
114 Color photo-response curve
116 Color photo-response curve
118 Color photo-response Curve
410 Capture button to S1 block
420 Image acquisition and combination block
430 Capture button to S2 block
440 Image acquisition block
450 Image combination block
510 Capture button query
520 Image acquisition block
530 Image combination block
610 High resolution image
620 Aggregate low resolution image
630 Resolution reduction block
640 Interpolation block
650 Residual computation block
660 Image combination block
670 Interpolation block
680 Image combination block
710 Motion estimation and compensation block
720 Map building block
730 Image formation block
740 Image formation block
810 Image acquisition block
820 Image combination block
830 Image combination block

What is claimed is:

1. A method comprising: capturing, using an image capture device, a low resolution image of a scene and a high resolution image of the scene; combining, using a response filter coupled to the image capture device, the low resolution image with other low resolution images to provide an aggregate low resolution image; and combining a version of the high resolution image with the aggregate low resolution image to provide an improved high resolution image by reducing the resolution of the high resolution image to provide an image representative of a low resolution image, wherein combining a version of the high resolution image with the aggregate low resolution image to provide the improved high resolution image further comprises: reducing the resolution of the high resolution image to provide an image representative of a low resolution image that could have been captured by the image capture device; and interpolating the representative low resolution image to provide an interpolated high resolution image, calculating a residual image from the high resolution image and the interpolated high resolution image; combining the representative low resolution image and the aggregate low resolution image to provide a final low resolution image; and providing the improved high resolution image using the final low resolution image and the residual image.

2. The method of claim 1, wherein the resolution of the high resolution image is reduced using substantially the same binning and decimation procedure used in the capture of the low resolution.

3. The method of claim 1, wherein combining the low resolution image with other low resolution images to provide an aggregate low resolution image further comprises correcting for motion present between the aggregate low resolution image and the representative low resolution image.

4. The method of claim 1, further comprising forming a map identifying matching pixels for which the aggregate low resolution image and the other low resolution images have matching scene data.

5. The method of claim 1, further comprising computing a weighted average of corresponding aggregate low resolution image and representative low resolution image pixel data.

6. A system comprising: an image capture device configured to capture a low resolution image of a scene and a high resolution image of the scene; a response filter coupled to the image capture device, wherein the response filter is configured to combine the low resolution image with other low resolution images to provide an aggregate low resolution image; and a processor configured to combine a version of the high resolution image with the aggregate low resolution image to provide an improved high resolution image by reducing the resolution of the high resolution image to provide an image representative of a low resolution image, wherein the processor is further configured to: reduce the resolution of the high resolution image to provide an image representative of a low resolution image that could have been captured by the image capture device; and interpolate the representative low resolution image to provide an interpolated high resolution image, calculate a residual image from the high resolution image and the interpolated high resolution image;

combine the representative low resolution image and the aggregate low resolution image to provide a final low resolution image; and provide the improved high resolution image using the final low resolution image and the residual image.

7. The system of claim 6, wherein the resolution of the high resolution image is reduced using substantially the same binning and decimation procedure used in the capture of the low resolution.

8. The system of claim 6, wherein the response filter is further configured to correct for motion present between the aggregate low resolution image and the representative low resolution image.

9. The system of claim 6, wherein the processor is further configured to form a map identifying matching pixels for which the aggregate low resolution image and the other low resolution images have matching scene data.

10. The system of claim 6, wherein the processor is further configured to compute a weighted average of corresponding aggregate low resolution image and representative low resolution image pixel data.

11. A non-transitory computer-readable medium having instructions stored thereon for providing an improved high resolution image using low resolution images and at least one high resolution image of a scene captured by an image capture device, the instructions comprising: instructions for capturing a low resolution image of a scene and a high resolution image of the scene; instructions for combining the low resolution image with other low resolution images to provide an aggregate low resolution image; and instructions for combining a version of the high resolution image with the aggregate low resolution image to provide an improved high resolution image by reducing the resolution of the high resolution image to provide an image representative of a low resolution image, wherein combining a version of the high resolution image with the aggregate low resolution image to provide the improved high resolution image further comprises: reducing the resolution of the high resolution image to provide an image representative of a low resolution image that could have been captured by the image capture device; interpolating the representative low resolution image to provide an interpolated high resolution image; calculating a residual image from the high resolution image and the interpolated high resolution image; combining the representative low resolution image and the aggregate low resolution image to provide a final low resolution image; and providing the improved high resolution image using the final low resolution image and the residual image.

12. The non-transitory computer-readable medium of claim 11, further comprising instructions for correcting for motion present between the aggregate low resolution image and the representative low resolution image.

13. The non-transitory computer-readable medium of claim 11, further comprising instructions for forming a map identifying matching pixels for which the aggregate low resolution image and the other low resolution images have matching scene data.

14. The non-transitory computer-readable medium of claim 11, further comprising instructions for computing a weighted average of corresponding aggregate low resolution image and representative low resolution image pixel data.

* * * * *